No. 838,806. PATENTED DEC. 18, 1906.
B. T. M. PEMBERTON.
CHURN.
APPLICATION FILED JULY 27, 1906.
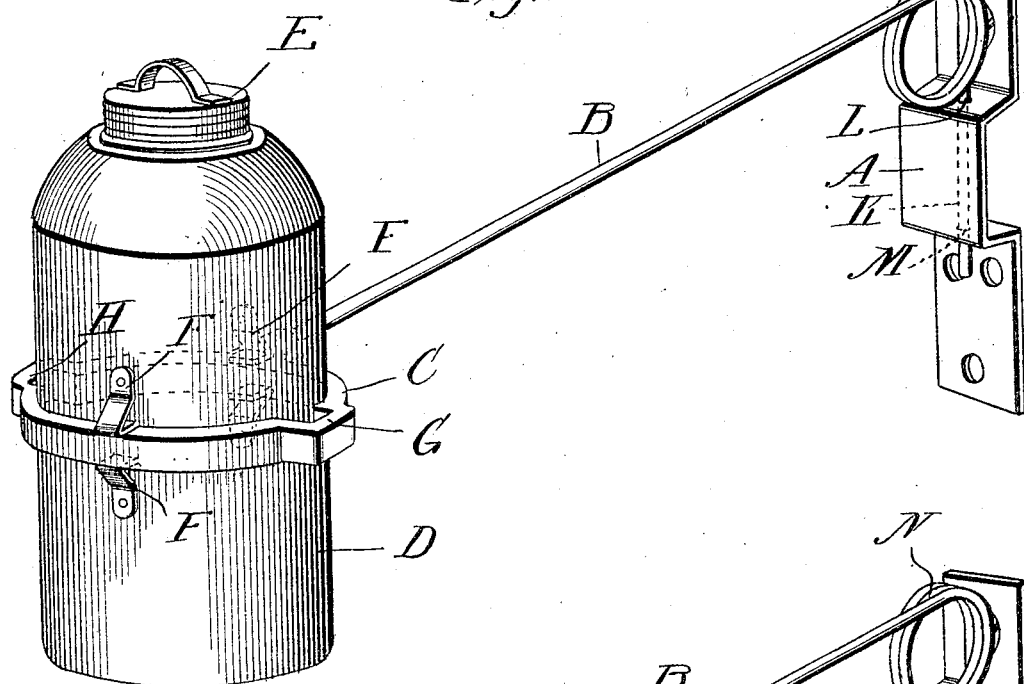
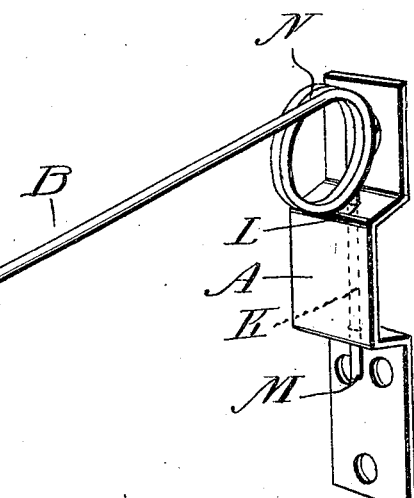
WITNESSES:
INVENTOR
Benjamin T. M. Pemberton

UNITED STATES PATENT OFFICE.

BENJAMIN T. M. PEMBERTON, OF McLEANSBORO, ILLINOIS.

CHURN.

No. 838,806.  Specification of Letters Patent.  Patented Dec. 18, 1906.

Application filed July 27, 1906. Serial No. 328,056.

*To all whom it may concern:*

Be it known that I, BENJAMIN T. M. PEMBERTON, a citizen of the United States, residing at McLeansboro, in the county of Hamilton and State of Illinois, have invented a new and useful Churn, of which the following is a specification.

The invention relates to improvements in churns; and its object is to provide a device of this character which will be simple and inexpensive in construction and capable of easy operation; and it consists in the construction and novel combination of parts hereinafter fully described, illustrated in the accompanying drawings, and pointed out in the claims hereto appended.

In the drawings, Figure 1 is a perspective view showing the parts arranged for churning. Fig. 2 is a detail view showing the reciprocating spring member attached to its collar and fitted to its cuff.

Like letters of reference indicate corresponding parts in both figures of the drawings.

The letter A designates the supporting-cuff, which is fastened to a solid support; B, the reciprocating or oscillatory spring; C, the collar supporting the cream-receptacle, and D said receptacle or churn-body closed by the screw-cover E.

Two pairs of oppositely-disposed brackets F, spaced sufficiently apart to receive between them the collar C, are rigidly attached to the churn-body at opposite ends of a diameter passing through said body, and slotted recesses G and H provide means for passing the collar over the brackets and firmly grasping the churn about the zone lying between the oppositely-disposed bracket members.

In using the device the body D is placed in an upright position and filled to the proper extent with cream. The cap E is then applied, the same being screwed down, so as to prevent any leakage of cream from the interior of the churn. The body is then so adjusted as to bring the brackets F in coincidence with the slotted openings G and H in the collar C and when engagement between the collar and brackets has been effected is given a quarter-turn, in which position the body is held firmly by the collar. The reciprocating spring B, which is formed near its free extremity into a spiral spring N, terminates in a rod K, which is inserted in the apertures L and M in the cuff A. A reciprocating or oscillatory movement is then given to the churn by simply pushing on the spring B. During this oscillation of the body D the cream is dashed from one end of the churn to the other. I claim results peculiarly favorable to the formation of butter from cream thus oscillated in the arc of a circle. The path described by the cream in process of churning is that of a closed curve somewhat as traced by the figure 8, the body of the descending cream, generally speaking, passing through the cream in course of ascent, causing a friction upon the butter corpuscles not experienced in ordinary churns and a result quite impossible in a churn of similar structure vibrating laterally in a right line, whether vertically or horizontally. By means of my improved churn the butter corpuscles are not ruptured, but are isolated from the cream with remarkable rapidity, and the butter thus produced is notable for the delightful character of its flavor.

By the use of my improved churn the time of churning is reduced to a minimum, and the simplicity of the invention contributes to cleanliness in every detail of the butter production.

I have shown and described but one embodiment of my invention, the same being that which is deemed by me at this time to be the preferable one. It is obvious, however, that many minor changes in the construction and relative arrangement of parts may be made without departing from the nature and spirit of my invention, and I do not desire to be limited to the exact details shown.

Having thus described my invention, what I claim as new, and desire to secure by Letters Patent, is—

1. In a churn, the combination of a movable vessel or body provided with a plurality of oppositely-disposed brackets rigidly secured to said body, each pair of brackets spaced apart and adapted to receive a collar within the spacing, a reciprocating rod rigidly attached to the collar and formed near its distal extremity into a spiral spring and terminating in a short rod adapted to engage a series of openings in a metallic cuff, means for supporting said cuff rigidly against a vertical surface, and means for imparting a reciprocal motion to the churn-body in the arc of a circle.

2. In a churn, the combination of a movable vessel or body, greater in diameter at the base than at the top, screw-threads upon the open upper end thereof, suspending means for said body which provides for the support of the same in a horizontal position and for an oscillatory movement in the arc of a circle to be imparted thereto, a cap screwed upon the upper end of said body for the purpose set forth.

3. A churn comprising a cylindrical body, a plurality of pairs of oppositely-disposed brackets spaced apart and rigidly attached to a central zone of said churn-body, a collar provided with slots adapted to admit the brackets, means for attaching the collar firmly to the churn-body, a flexible rod rigidly attached to the collar and projecting from a suitable base.

In testimony that I claim the foregoing as my own I have hereunto affixed my signature in the presence of two witnesses.

BENJAMIN T. M. PEMBERTON.

Witnesses:
L. L. CREASEY,
C. E. JENNINGS.